United States Patent
McCommons

(10) Patent No.: US 11,936,153 B2
(45) Date of Patent: Mar. 19, 2024

(54) PRECISION SOLDERING FIXTURE

(71) Applicant: James McCommons, Daytona Beach, FL (US)

(72) Inventor: James McCommons, Daytona Beach, FL (US)

( * ) Notice: Subject to any disclaimer, the term of this patent is extended or adjusted under 35 U.S.C. 154(b) by 0 days.

(21) Appl. No.: 18/311,692

(22) Filed: May 3, 2023

(65) Prior Publication Data

US 2023/0361521 A1    Nov. 9, 2023

Related U.S. Application Data

(60) Provisional application No. 63/337,882, filed on May 3, 2022.

(51) Int. Cl.
*B23K 37/04*  (2006.01)
*B23K 3/08*   (2006.01)
*H01R 43/02*  (2006.01)

(52) U.S. Cl.
CPC ......... *H01R 43/0263* (2013.01); *B23K 3/087* (2013.01)

(58) Field of Classification Search
CPC .............................. B23K 3/087; H01R 43/0263
See application file for complete search history.

(56) References Cited

U.S. PATENT DOCUMENTS

| 670,530 | A | * | 3/1901 | Brownell | A61F 5/32 |
| | | | | | 128/124.1 |
| 1,725,553 | A | * | 8/1929 | White | H01R 4/34 |
| | | | | | 439/737 |
| 2,221,108 | A | * | 11/1940 | Rathbun | B23K 3/087 |
| | | | | | 269/45 |
| 2,755,760 | A | * | 7/1956 | Fermanian | B23K 3/087 |
| | | | | | 228/6.2 |
| 2,960,953 | A | * | 11/1960 | Schneider | B23K 3/087 |
| | | | | | 269/1 |
| 3,552,257 | A | * | 1/1971 | Tanabe | F16B 37/16 |
| | | | | | 411/419 |
| 4,718,164 | A | | 1/1988 | Hokanson | |

(Continued)

OTHER PUBLICATIONS

Landin81, Solder Cableholder, retrieved from the internet retrieved on May 3, 2023 <URL: https://www.thingiverse.com/thing: 1203831>.

(Continued)

*Primary Examiner* — Erin B Saad
*Assistant Examiner* — Carlos J Gamino

(57) ABSTRACT

A precision soldering fixture provides a way to align and hold wires in place for soldering. The precision soldering fixture comprises a support member and a clamping assembly. The support member includes one or more elongated channels and may include a connector notch for holding and soldering wires. The clamping assembly comprises a nut and bolt base mechanism including clamping bars to hold the wires and preferably knurled fingers nuts, tightening the clamping bars, and thus the wires, in place. There can also be attachments secured to the support member to facilitate use. One such attachment may be a vise block fastened to the support member when securing the precision soldering fixture in a vise. Additionally, an alligator clip may be secured between the support member and the vise block, clipping the precision soldering fixture for soldering wires in situ. Further, a base with a magnet may be attached.

20 Claims, 13 Drawing Sheets

(56) References Cited

U.S. PATENT DOCUMENTS

| | | | |
|---|---|---|---|
| 5,108,023 A * | 4/1992 | Japichino | H01L 21/67144 |
| | | | 269/254 R |
| 6,598,727 B2 | 7/2003 | Kasuya | |
| 7,165,762 B1 * | 1/2007 | Duzick | B25B 1/22 |
| | | | 269/45 |
| 8,091,757 B1 | 1/2012 | Stawarski | |
| 8,096,463 B2 * | 1/2012 | Delrosso | H01G 13/006 |
| | | | 228/123.1 |
| 9,685,769 B2 | 6/2017 | Fujita | |
| 10,507,541 B2 | 12/2019 | Nelson | |
| 11,033,976 B1 * | 6/2021 | Schmidt | B23K 1/0016 |
| 2013/0270758 A1 | 10/2013 | Wittliff | |
| 2022/0045467 A1 * | 2/2022 | MulHolland | B25B 5/003 |

OTHER PUBLICATIONS

NovelLife, Cable Connection Fixture Magnetic Holder Base, retrieved from the internet retrieved on May 3, 2023 <URL: https://www.aliexpress.com/item/32964346475.html>.

Lisle, Magnetic Soldering Clamp, retrieved from the internet retrieved on May 3, 2023 <URL: https://tinyurl.com/y4ahjw7v>.

Clip Holder Third Hand Tool Magnetic Soldering Clamp Wire Holder Assembly, retrieved from the internet retrieved on May 3, 2023 <URL: https://www.ebay.com/itm/144428402085>.

\* cited by examiner

PRECISION SOLDERING FIXTURE

FIELD OF THE INVENTION

The present invention relates generally to a soldering device. More specifically, the present invention relates to a metallic soldering fixture that can be used to align wires.

BACKGROUND OF THE INVENTION

An efficient soldering fixture that can be used to align wires is in demand. Various soldering tools and fixtures are currently used in production environments. For example, when soldering strands of wire together, an alligator clip device is commonly used. However, many people find it difficult to align two clips with respect to each other.

Conventional soldering-holding fixtures generally employ alligator clips attached to movable arms with joints connected to a heavy, metallic, non-magnetic base. This conventional design can be sufficient on a flat workbench when working with larger-gauge wires. However, the conventional design makes gripping smaller-gauge wires (in the 18-gauge range or smaller) extremely difficult. Also, when using alligator clips, the teeth tend to penetrate the wires' insulation, making them susceptible to corrosion and shorting.

In some situations, wires can also slip between the teeth and not be held at all. Any slight disturbance or bumping of the fixture's arms necessitates their realignment before resuming soldering, which can happen several times during one soldering process. Thus, there is a need to develop a device to solve these problems.

The present invention is intended to address the problems associated with and/or otherwise improve on conventional devices through an innovative soldering device designed to provide a convenient and effective means to align and hold wires in place for a soldering process while incorporating other problem-solving features.

SUMMARY OF THE INVENTION

A precision soldering fixture that provides a means for aligning electrical items that need soldering, usually two wires. The present invention comprises aligned channels for placing one or more wires into the aligned channels thereby aligning the one or more wires for soldering. The present invention further comprises a clamping assembly for clamping and holding the wires in place during the process of soldering. The present invention includes a perpendicular groove for providing a gap between the bare wire ends and the precision soldering fixture. During the process of soldering, the hot element of the soldering iron could damage the surface of the soldering fixture, or the solder could attach the bare wire ends to the fixture if the groove was not provided. A base is also provided that comprises of various embodiments. One embodiment provides a base with a magnet. Another embodiment is a base comprising of a large metal plate that attaches to the bottom of the present invention. This helps stabilize the fixture on flat surfaces. Another embodiment is a base comprising of a vise block. With the vise block attached, the fixture can be clamped in a vise for holding the fixture in place during soldering. Another embodiment is a base further comprising an alligator clip pinched between the fixture and the vise block enabling the fixture to be clipped and hung in place for soldering wires in situ.

DETAIL DESCRIPTIONS OF THE INVENTION

Figure 1:
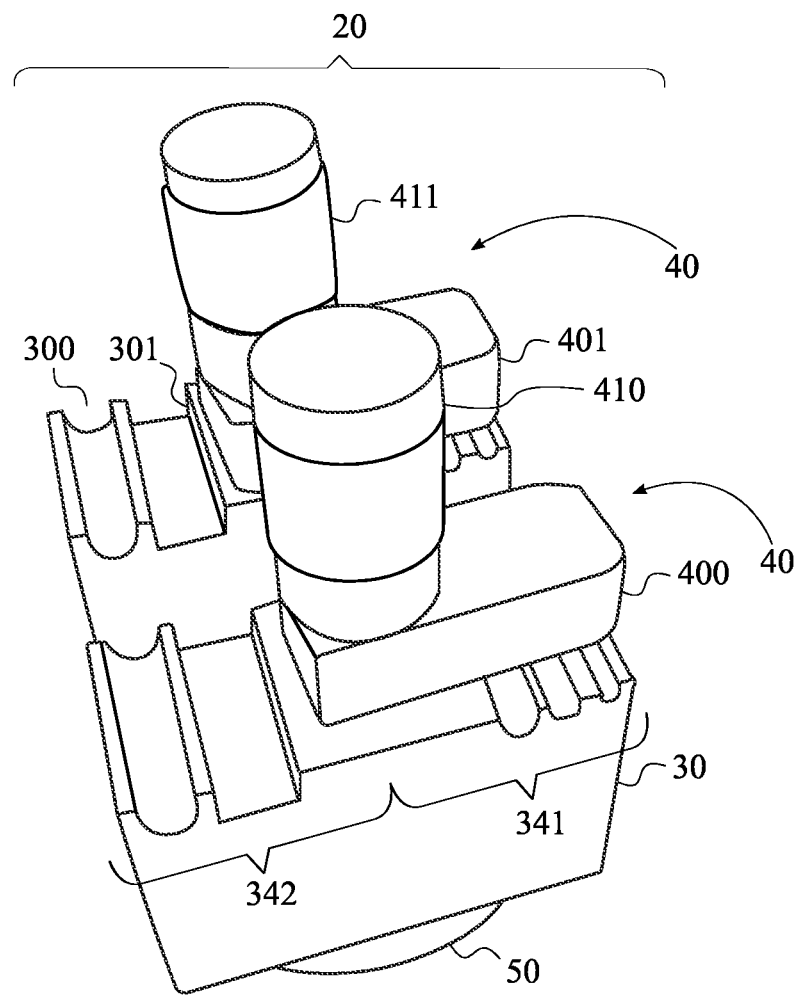
FIG. 1 is a top side perspective view of the present invention, in accordance with some embodiments.

All illustrations of the drawings are for the purpose of describing selected versions of the present invention and are not intended to limit the scope of the present invention.

As used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

"First", "second" etc. as contained herein are terms used as labels for nouns that they precede and do not imply ordering unless context deems otherwise.

The present disclosure has broad utility and application. Any embodiment may incorporate only one of a plurality of the disclosed aspects of the present invention and may further incorporate only one or a plurality of the disclosed features of the present invention.

The present invention provides a device that perfectly aligns two items, usually wires of corresponding sizes but not limited to this. Thus, the present invention can be used to position (align) individual wires for soldering.

The present invention can be substantially small in size, allowing use in virtually any surroundings, in any position (vertical or horizontal), or in tight spaces. The present invention may be used together with accessories in assisting in placing and supporting the present invention.

As shown in FIG. 1 to FIG. 4, the present invention provides a precision soldering fixture 20 comprising a support member 30 and a clamping assembly 40. The support member 30 includes a top surface 340, a base surface 350 and a lateral surface 360. The clamping assembly 40 can be attached, preferably configured on the top surface 340, to the support member 30 to form the precision soldering fixture 20 of the present invention. The support member 30 can be of any suitable shape and size and made of any material suitable for holding wires or similar items, including metal.

Figure 5:
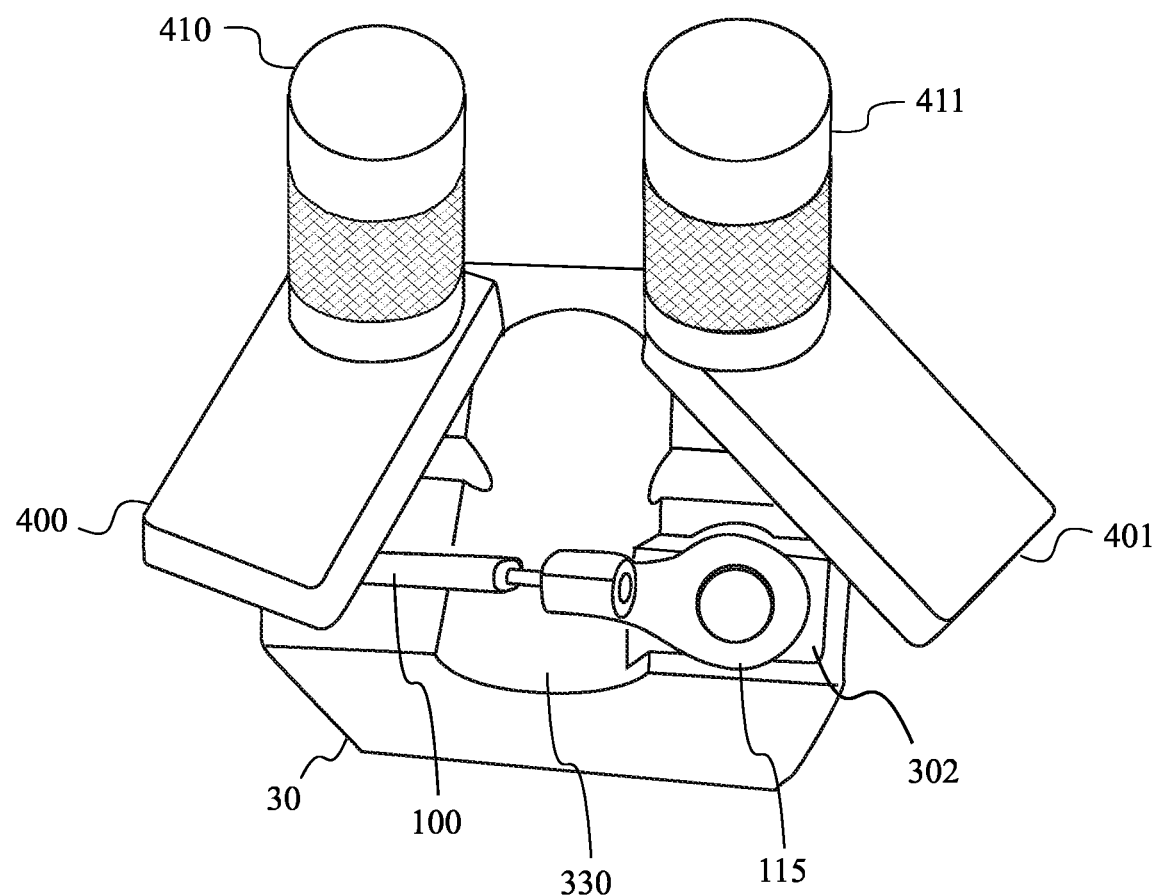
FIG. 5 is a top front perspective view of the present invention, in accordance with some embodiments.
Figure 6:
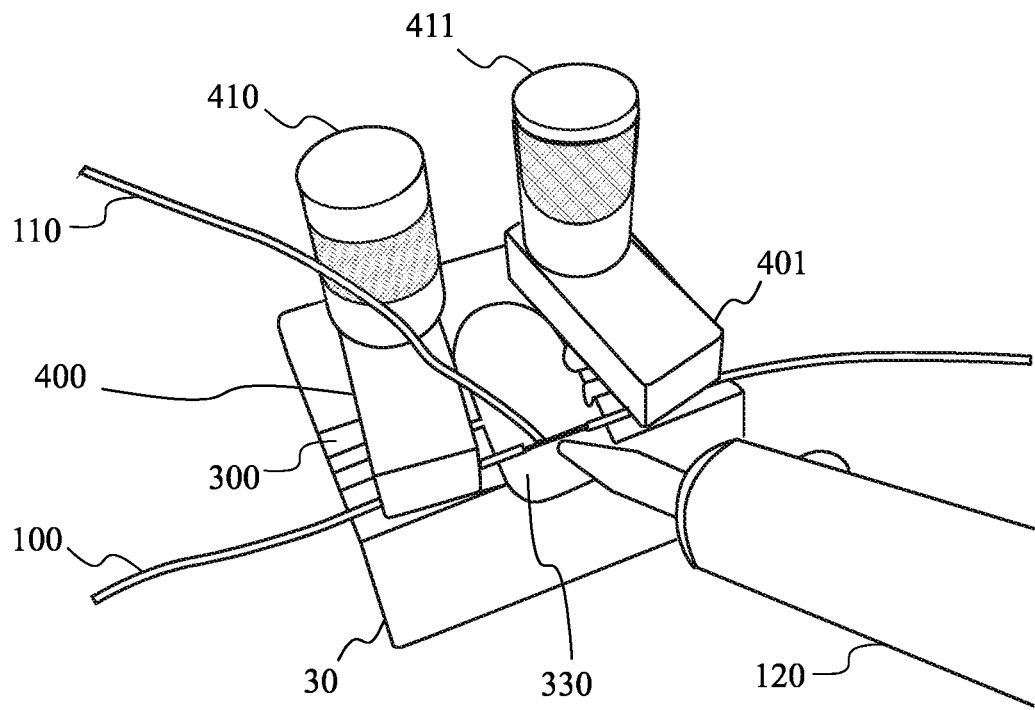
FIG. 6 is a top front perspective view of the present invention, in accordance with some embodiments.

The support member 30 may include at least one elongated channel 300 etched into any suitable surface of the support member 30, preferably etched into the top surface 340, that allows at least one wire 100 to be partially set in, as shown in FIG. 5 and FIG. 6. One of the at least one elongated channel 300 partially receives one of the at least one wire 100. A wire portion of one of the at least one wire 100 extends above the surface of the support member 30. This may allow the clamping assembly 40 to removably secure one of the at least one wire 100 within one of the at least one elongated channel 300. A cross-sectional profile of one of the at least one elongated channel 300 may be a semi-circle or may be a generally rectangular-shaped cross-sectional profile but not limited to this. The profile is formed with opposing walls 301 and a floor with an open channel top side. The support member 30 may also include a perpendicular groove 330 extending in a perpendicular direction relative to one of the at least one elongated channel 300 and preferably etched into the top surface 340. Opposing sides of the perpendicular groove 330 can be a substantially planar surface, while a groove base of the perpendicular groove 330 can also be substantially plain and join the opposing sides of the perpendicular groove 330 using a concave shape or a plane. The perpendicular groove 330 can be placed substantially in the middle of the support member 30 to provide a place for the user to solder the wires aligned and held in place, for example, via solder 110 and a soldering iron 120. A depth below the top surface 340 for the perpendicular groove 330 is any suitable depth to establish a gap between the support member 30 and ends of the at least one wire 100 for soldering.

Figure 2:
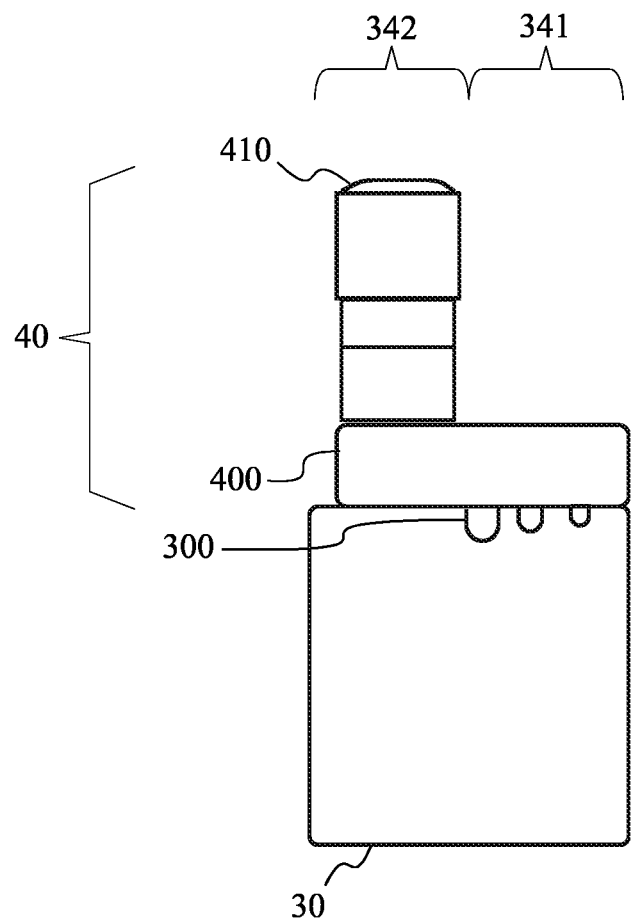
FIG. 2 is a side view of the present invention, in accordance with some embodiments.
Figure 3:
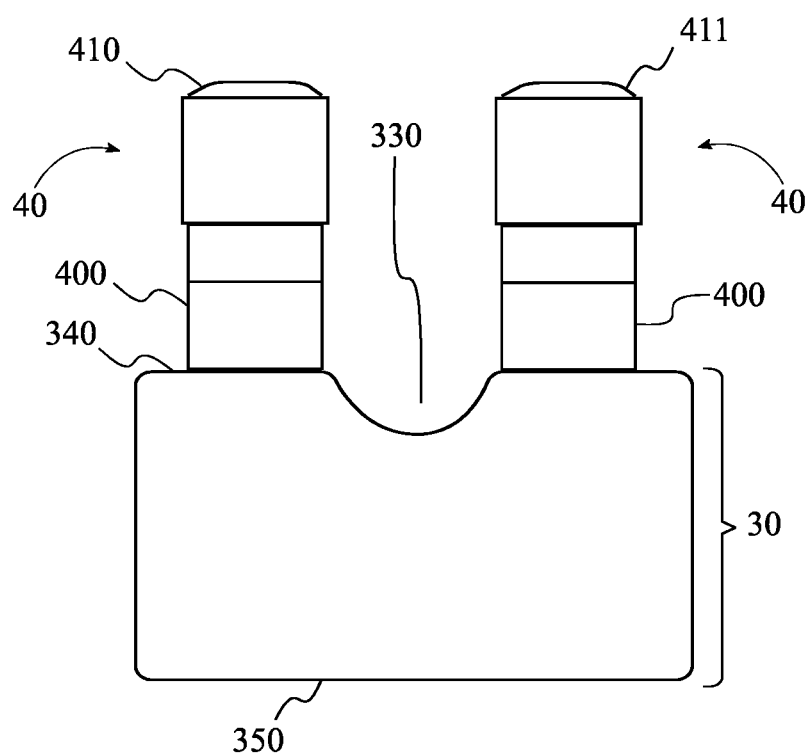
FIG. 3 is a front view of the present invention, in accordance with some embodiments.
Figure 4:
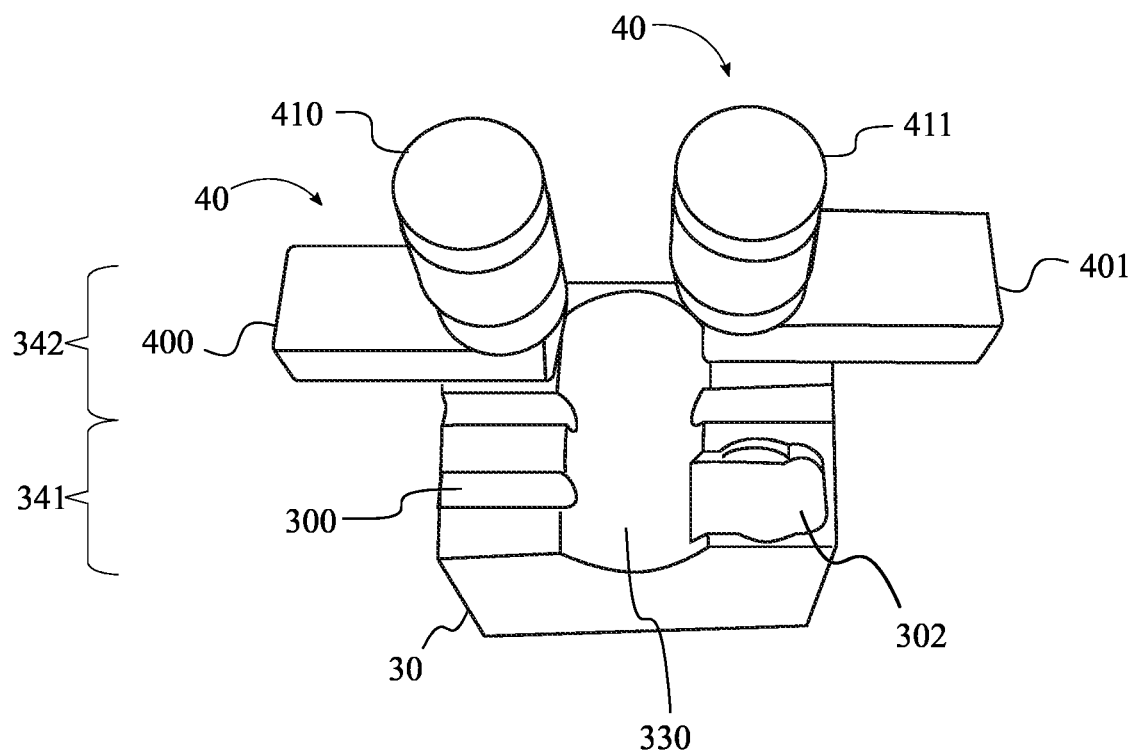
FIG. 4 is a top front perspective view of the present invention, in accordance with some embodiments.

In some embodiments, the at least one elongated channel 300 and the perpendicular groove 330 can be positioned only on a front area 341 or a rear area 342 of the top surface 340 of the support member 30, as shown in FIG. 2 and FIG. 4.

Figure 7:
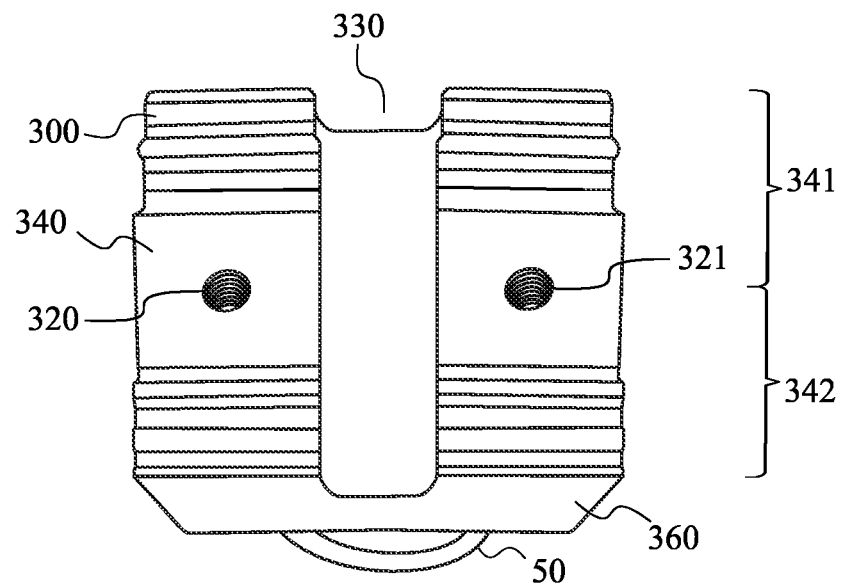
FIG. 7 is a top front perspective view of the present invention disassembled, in accordance with some embodiments.
Figure 7:
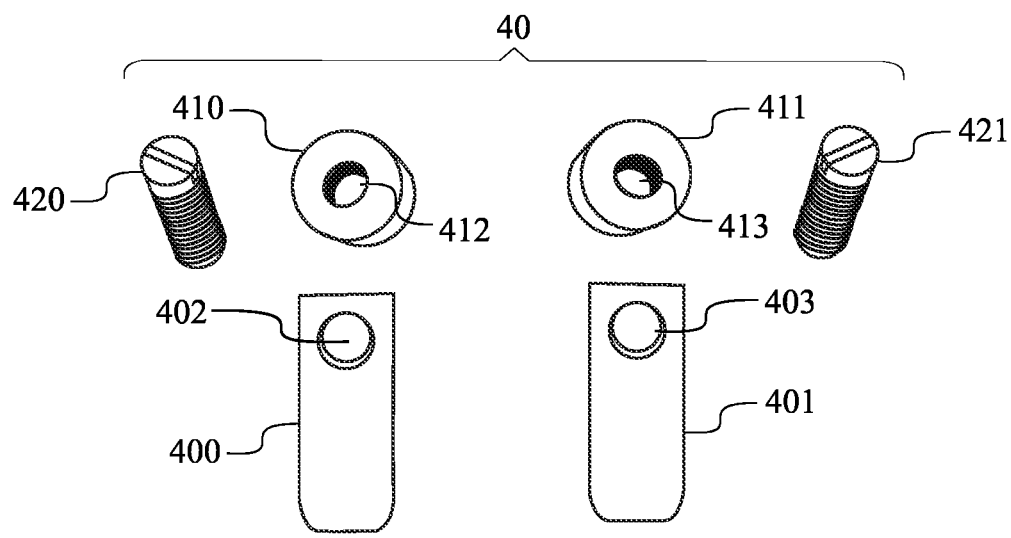

In some other embodiments, the at least one elongated channel 300 and the perpendicular groove 330 can be positioned on both of the front and the rear area of the top surface 340 of the support member 30 with the perpendicular groove 330 extending continuously from the front area to the rear area, as shown in FIG. 1 and FIG. 7.

Figure 8:
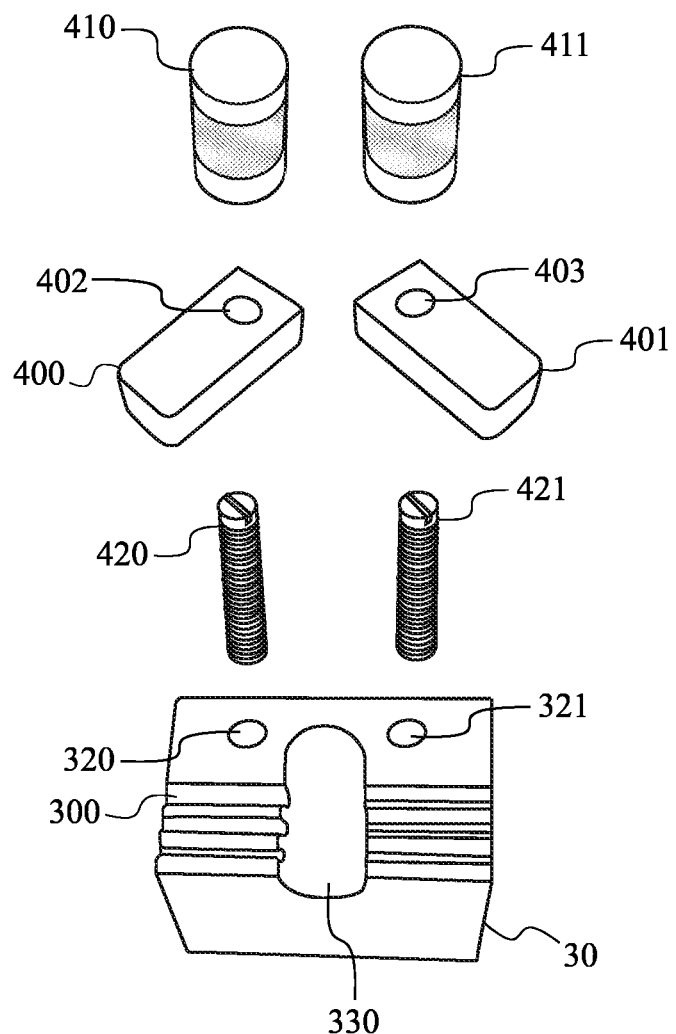
FIG. 8 is a top front perspective exploded view of the present invention in one configuration in use, in accordance with some embodiments.

In one preferred embodiment, at least one elongated channel 300 are positioned on both the front area 341 and rear area 342 of the top surface 340 of the support member 30, as shown in FIG. 7 and FIG. 8, with the perpendicular groove 330 located in the middle and generally perpendicular to the longitudinal axis of the support member 30.

In an exemplary embodiment, the support member 30 may receive the at least one wire 100 so that the at least one wire 100 generally extend horizontally along the support member's longitudinal axis. Other orientations are possible in alternative embodiments, as shown in FIG. 6.

In some other embodiments, the support member 30 may include multiple elongated channels 300 placed in parallel and equally spaced on the support member's top surface 340 to hold multiple wires. The multiple elongated channels 300 may have different sizes for receiving different sizes of wires, as shown in FIG. 2.

In some other embodiments, one of the at least one elongated channel 300 may terminate in a connector notch 302 as shown in FIG. 4. The connector notch 302 is configured to receive an electrical connector 115. The connector notch 302 may be positioned on the top surface 340 to functionally operate with the clamping assembly 40. The connector notch 302 may be a generally circular-shaped notch in some embodiments. In some other embodiments, the connector notch 302 may be a generally rectangular-shaped. In some other embodiments, the generally circular-shaped connector notch 302 may be superimposed on the rectangular-shaped notch. As shown in FIG. 5, the connector notch 302 receives the electrical connector 115. A connecting end of the electrical connector 115 may extend into the perpendicular groove 330. This may facilitate soldering one of the at least one wire 100 to the electrical connector 115.

The clamping assembly 40, which can be configured to be operated or adjusted without any tools, can be arranged to hold wires in place on the support member 30, as shown in FIG. 4 and FIG. 5.

In one embodiment, the clamping assembly 40 can include a nut-and-bolt-based mechanism for providing a clamping function to hold wires onto the support member 30.

As shown in FIG. 7 and FIG. 8, in some embodiments, the clamping assembly 40 can include a first knurled finger nut 410, a second knurled finger nut 411, a first captive screw 420, and a second captive screw 421. The first knurled finger nut 410 and second knurled finger nut 411 can be of any suitable shape and size, including cylindrical or rectangular. The first knurled nut 410 defines a first cavity 412. The second knurled finger nut 411 defines a second cavity 413.

The first captive screw 420 and the second captive screw 421, which can be any screw known in the art. The support member 30 further comprises a first screw hole 320 and a second screw hole 321, each screw hole being generally normal to the top surface 340. The first captive screw 420 and the second captive screw 421 may include spiral threads on each outer surface. The first screw hole 320 and the second screw hole 321 may include female spiral threads on each screw hole wall. The first screw hole 320 and the second screw hole 321 depths can be suitable depths below the top surface 340 to operably receive the first captive screw 420 and the second captive screw 421, respectively. The first screw hole 320 and the second screw hole 321 partially receive the first captive screw 420 and the second captive screw 421, respectively, with a first portion of the first captive screw 420 and a second portion of the second captive screw 421 extending outwardly from the support member 30. Screw heads of the first captive screw 420 and the second captive screw 421 may include a slot for a screwdriver to facilitate rotating the captive screws into the screw holes.

In one preferred embodiment, the first screw hole 320 and the second screw hole 321 are placed, preferably on the top surface 340 and substantially near of the top surface's lateral ends so that wires can be properly clamped by clamping bars that can be included in the clamping assembly 40 and rotatably attached to the first captive screw 420 and second captive screw 421. The clamping bars can be of any size and shape suitable for holding the wires onto the support member 30. The clamping assembly 40 may include a first clamping bar 400 and a second clamping bar 401. The first clamping bar may include a first bar hole 402. The second clamping bar may include a second bar hole 403. So for example, the first clamping bar 400 and the second clamping bar 401 can comprise rectangular bars pivotally connected, via the first bar hole 402 and the second bar hole 403, to the first captive screw 420 and the second captive screw 421, respectively, to allow the rectangular bars to press on one of the at least one wire 100 and hold one of the at least one wire 100 in one of the at least one elongated channel 300 when the first knurled finger nut 410 and/or the second knurled finger nut 411 are/is screwed down on the rectangular bars.

In some embodiments, wherein the at least one elongated channel 300 and the perpendicular groove 330 are positioned only on the front area 341 or the rear area 342, the screw holes may be positioned on the opposite areas from the at least one elongated channel 300.

In some embodiments, wherein the at least one elongated channel 300 and the perpendicular groove 330 are positioned on both the front area 341 and the rear area 342, the screw holes may be positioned in the middle relative to a transverse axis of the support member 30 and between the at least one elongated channel 300.

The first knurled finger nut 410 can be mounted to the first portion of the first captive screw 420 that extends outwardly from the support member 30 with the first cavity 412 receiving the first portion. Likewise, the second knurled finger nut 411 can be mounted to the second portion of the second captive screw 421 extending outwardly from the support member 30 with the second cavity 413 receiving the second portion.

In some embodiments, the clamping assembly 40 can also be provided with a pair of lock washers, constructed of a metallic or non-metallic compressible material, such as silicone, and positioned between the first knurled finger nut 410 and the second knurled finger nut 411 and the support member 30.

In some embodiments, the support member 30 may be configured to fix the wires on the support member 30 using clamps or fingers that can hold the wires as shown in FIG. 5.

In yet some other embodiments, the present invention may include a base 50 that can be mounted on the bottom side of the support member 30. The base 50 includes a through hole 71, preferably in a central location of the base 50 (not shown). The though hole receives a base fastener 90. The through hole 71 may have a countersink feature so a head of the base fastener 90 can sit generally flush on a bottom surface of the base 50. The base fastener 90 may be a bolt, or screw or the like without limit. The support member 30 further comprises a base hole 303, preferably on the base side and generally normal to the base surface 350. The base hole 303 may be any suitable fastening depth for securely fastening the base 50 to the support member 30.

Figure 9:
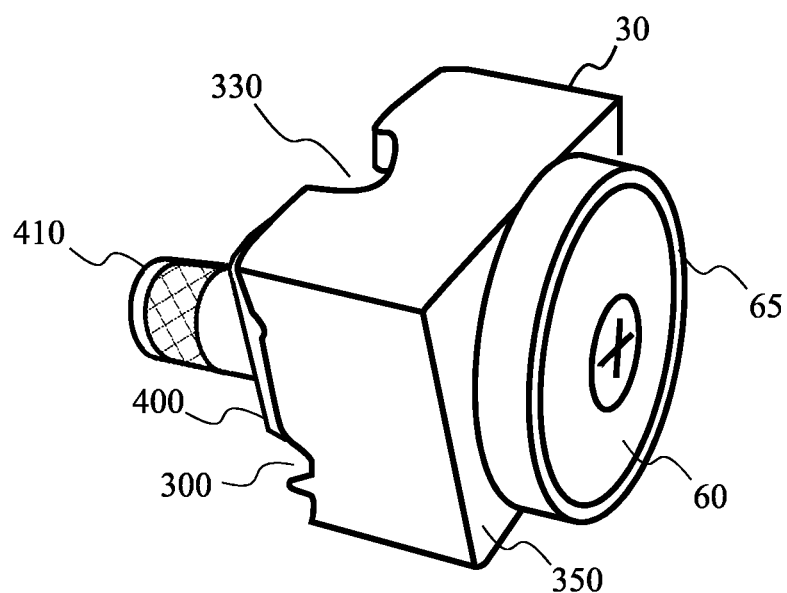
FIG. 9 is a bottom side perspective view of the present invention, in accordance with some embodiments.

In some embodiments, the base 50 may be in a round shape and may include a base compartment 65. The base compartment 65 may include an opening. The base 50 may further include a magnet 60 (e.g., a permanent magnet), as shown in FIG. 9. The magnet 60 may be stored in the base compartment 65 and may be fastened with the base fastener 90. The magnet 60 provides the present invention to be removably attached to magnetic objects.

Figure 10:
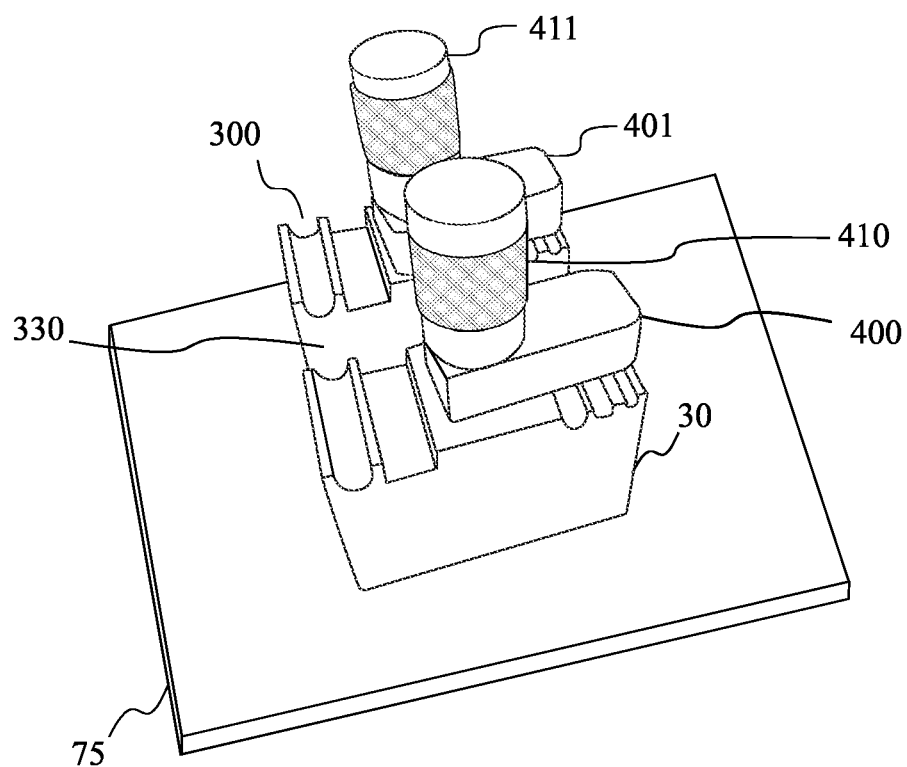
FIG. 10 is a top side perspective view of the present invention, in accordance with some embodiments.

In some embodiments, the base 50 may be a plate structure 75, shown in FIG. 10. The plate structure 75 may be constructed of metal and have a generally rectangular shape. The plate structure 75 helps stabilize the present invention while in use on a flat surface.

In some embodiments, the base 50 may be a vise block 70. The vise block 70 may be a rectangular prism shaped block. The vise block 70, when attached may be used to removably secure the present invention in a vise clamp.

Figure 11:
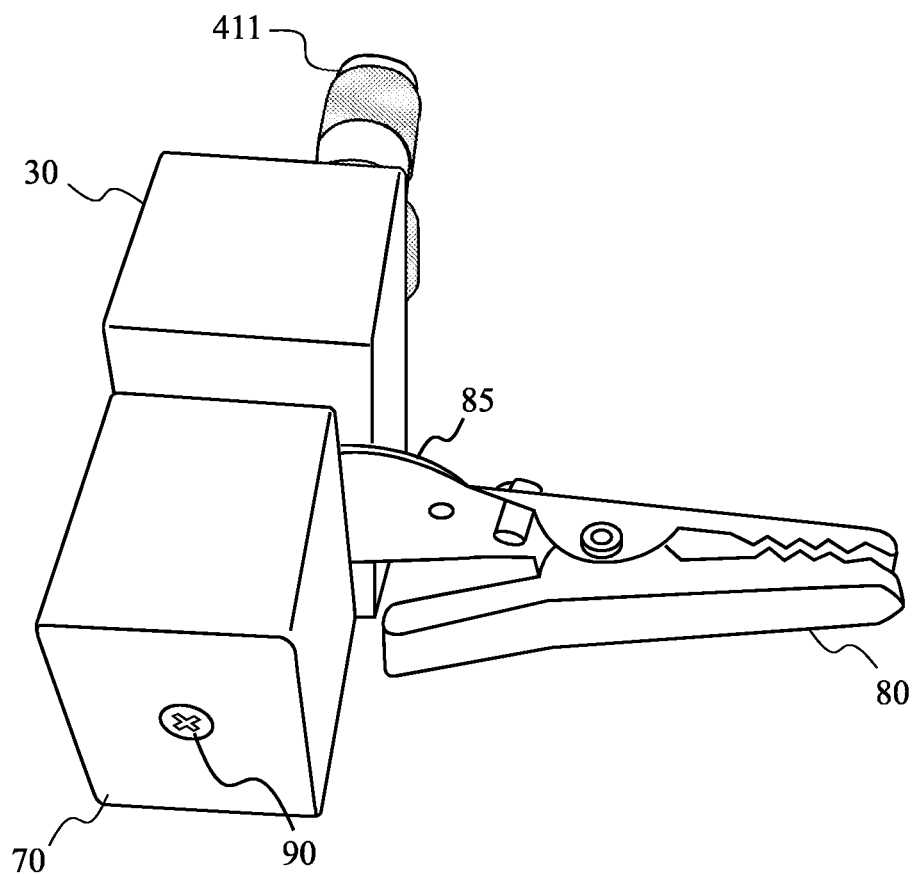
FIG. 11 is a bottom side perspective view of the present invention, in accordance with some embodiments.
Figure 12:
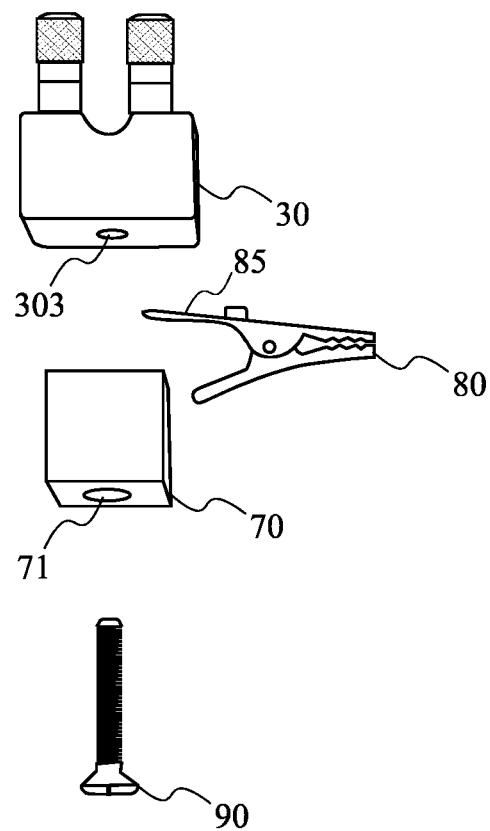
FIG. 12 is a bottom front perspective exploded view of the present invention, in accordance with some embodiments.

In some other embodiments, the base 50 may include the vise block 70 and an alligator clip 80, as shown in FIG. 11 and FIG. 12. The alligator clip 80 comprises an upper and lower jaw, a closing spring and an extended tab. The upper jaw, the lower jaw, and the closing spring are configured so that the closing spring exerts pressure on the upper jaw and the lower jaw, so the upper jaw and the lower jaw are pushed together. The extended tab 85 may be integral with the upper jaw or the lower jaw. The extended tab 85 is removably secured between the base surface 350 of the support member 30 and the vice block 70 when the base fastener 90 is tightened.

In use for exemplary embodiments, the at least one wire 100 is held in place by the first and the second fingers over the at least one elongated channel 300 and are tightened onto the first clamping bar 400 and the second clamping bar 401. At least one bare wire end of the at least one wire 100 protrude out from the at least one channel 300 midway over the perpendicular groove 330 from each side of the perpendicular groove 330, meeting generally in the middle of the perpendicular groove 330. The perpendicular groove 330 facilitates clearance for the wires, now perfectly aligned and held fast, to be soldered.

In some other exemplary embodiments, one of the at least one wire 100 and the electrical connector 115 meet generally in the middle of the perpendicular groove 330. One of the at least one wire 100 is clamped into one of the at least one elongated channel 300 via the first clamping bar 400 and the electrical connector 115 is clamped in the connector notch 302 via the second clamping bar 401. The first clamping bar 400 and the second clamping bar 401 are clamped down via the first knurled finger nut 410 and the second knurled finger nut 411. The connecting end of the electrical connector 115 and the bare wire end of one of the at least one wire 100 protrude out from the at least one elongated channel 300, meeting generally in the middle of the perpendicular meeting. The perpendicular groove 330 facilitates clearance for the bare wire end and the electrical connector 115, now perfectly aligned and held fast, to be soldered.

Figure 13:
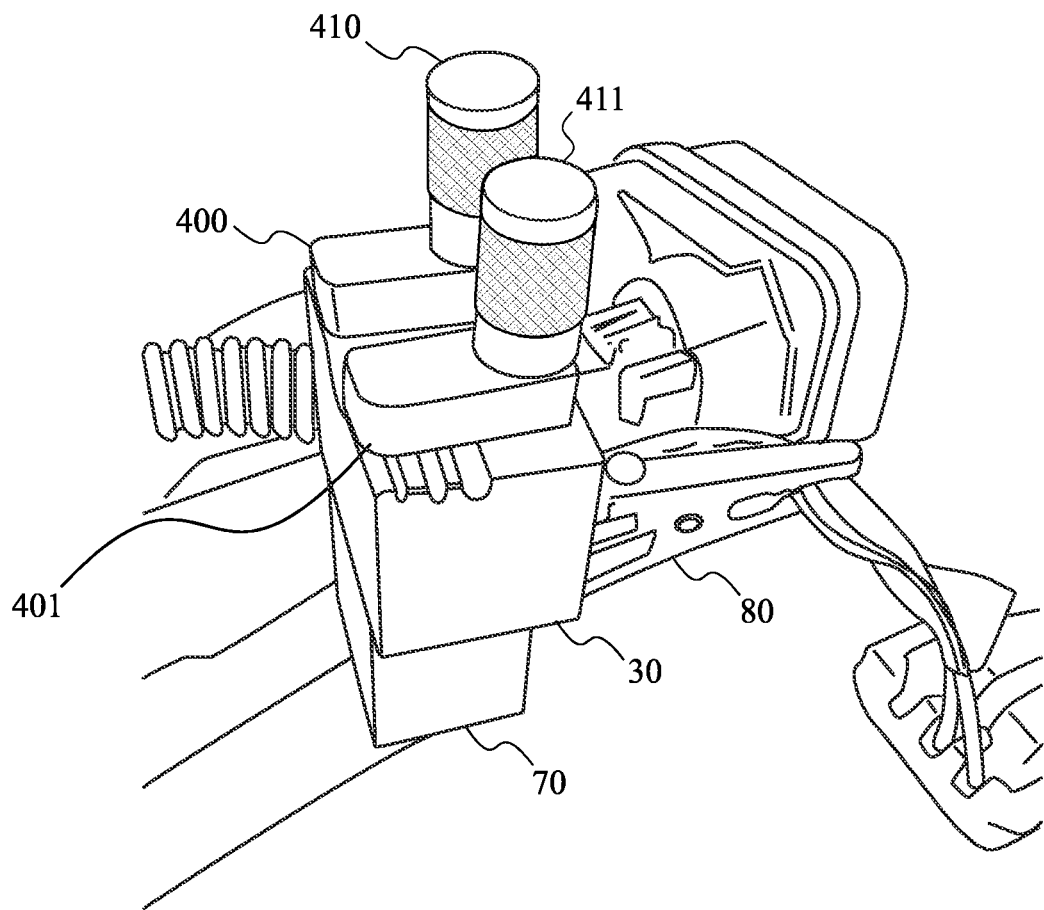
FIG. 13 is a front side perspective view of the present invention, in accordance with some embodiments.

As shown in exemplary embodiments, as shown in FIG. 13, the present invention can be clipped to items by means of the alligator clip 80 when fastened to the present invention to work on wires in situ.

Although the invention has been explained in relation to its preferred embodiment, it is to be understood that many other possible modifications and variations can be made without departing from the spirit and scope of the invention.

What is claimed is:

1. A precision soldering fixture comprises:
   a support member; and
   a clamping assembly;
   the support member further comprises at least one elongated channel,
      a perpendicular groove,
      a first screw hole,
      a base surface, and
      a top surface;
   the clamping assembly further comprises a first captive screw,
      a first knurled finger nut, and
      a first clamping bar;
   the top surface further comprises:
      a front area, and
      a rear area;
   wherein:
   the first knurled finger nut defines a first cavity;
   a first captive screw hole partially receives the first captive screw wherein a first portion of the first captive screw extends outwardly from the support member;
   the first clamping bar is pivotally attached to the first captive screw;

the first cavity rotatably receives the first portion of the first captive screw;
one of the at least one elongated channel partially receives one of the at least one wire;
a wire portion of one of the at least one wire extending above the top surface of the support member; and
the first clamping bar is clamped down on one of the at least one wire via the first knurled finger nut.

2. The precision soldering fixture as claimed in claim 1 further comprises:
the support member further comprises a second screw hole;
the clamping assembly further comprises a second captive screw,
a second knurled finger nut, and
a second clamping bar;
wherein:
the second knurled finger nut defines a second cavity;
a second captive screw hole partially receives the second captive screw wherein a second portion of the second captive screw extends outwardly from the support member;
the second clamping bar is pivotally attached to the second captive screw;
the second cavity rotatably receives the second portion of the second captive screw; and
the second clamping bar is clamped down via the second knurled finger nut.

3. The precision soldering fixture as claimed in claim 2 wherein the at least one elongated channel runs generally parallel with a longitudinal axis of the support member.

4. The precision soldering fixture as claimed in claim 3 wherein:
one of the at least one elongated channel is positioned on the front area of the top surface;
the first screw hole, the second screw hole, and the perpendicular groove are positioned on a rear area of the top surface; and
the first screw hole and the second screw hole are placed substantially near lateral ends of the top surface.

5. The precision soldering fixture as claimed in claim 3 wherein:
one of the at least one elongated channel and the perpendicular groove are positioned on the front area of the top surface;
one of the at least one elongated channels and the perpendicular groove are positioned on the rear area of the top surface;
the first screw hole and the second screw hole may be positioned in the middle relative to a transverse axis of the support member and between the at least one elongated channel; and
the first screw hole and the second screw hole are placed substantially near lateral ends of the top surface.

6. The precision soldering fixture as claimed in claim 3 wherein one of the at least one elongated channel terminates in a connector notch.

7. The precision soldering fixture as claimed in claim 1 further comprises:
a base;
wherein:
the base further comprises a
base fastener; and
the base is fastened to the support member with the base fastener wherein the support member further comprises a base hole.

8. The precision soldering fixture as claimed in claim 7 further comprises:
the base further comprises a base compartment; and
the base compartment stores a magnet.

9. The precision soldering fixture as claimed in claim 7 wherein the base is a vise block.

10. The precision soldering fixture as claimed in claim 8 further comprises:
the base further comprises an alligator clip;
the alligator clip further comprises an extended tab; and
the extended tab is removably secured between the base surface of the support member and the vice block when the base fastener is tightened.

11. A precision soldering fixture comprises:
a support member; and
a clamping assembly;
the support member further comprises at least one elongated channel,
a perpendicular groove,
a first screw hole,
a base surface, and
a top surface;
the clamping assembly further comprises a first captive screw,
a first knurled finger nut, and
a first clamping bar; and
the top surface further comprises a front area and
a rear area;
wherein:
one of the at least one elongated channel terminates in a connector notch;
the first knurled finger nut defines a first cavity;
a first captive screw hole partially receives the first captive screw wherein a first portion of the first captive screw extends outwardly from the support member;
the first clamping bar is pivotally attached to the first captive screw;
the first cavity rotatably receives the first portion of the first captive screw;
one of the at least one elongated channel partially receives one of the at least one wire;
a wire portion of one of the at least one wire extending above the top surface of the support member; and
the first clamping bar is clamped down on one of the at least one wire via the first knurled finger nut.

12. The precision soldering fixture as claimed in claim 11 further comprises:
the support member further comprises a second screw hole;
the clamping assembly further comprises a second captive screw,
a second knurled finger nut, and
a second clamping bar;
wherein:
the second knurled finger nut defines a second cavity;
a second captive screw hole partially receives the second captive screw wherein a second portion of the second captive screw extends outwardly from the support member;
the second clamping bar is pivotally attached to the second captive screw;
the second cavity rotatably receives the second portion of the second captive screw; and
the second clamping bar is clamped down via the second knurled finger nut.

13. The precision soldering fixture as claimed in claim 12 wherein the at least one elongated channel runs generally parallel with a longitudinal axis of the support member.

14. The precision soldering fixture as claimed in claim 13 wherein:
- one of the at least one elongated channel is positioned on the front area of the top surface;
- the first screw hole, the second screw hole, and the perpendicular groove are positioned on a rear area of the top surface; and
- the first screw hole and the second screw hole are placed substantially near lateral ends of the top surface.

15. The precision soldering fixture as claimed in claim 13 wherein:
- one of the at least one elongated channel and the perpendicular groove are positioned on the front area of the top surface;
- one of the at least one elongated channel and the perpendicular groove are positioned on the rear area of the top surface;
- the first screw hole and the second screw hole may be positioned in the middle relative to a transverse axis of the support member and between the at least one elongated channel; and
- the first screw hole and the second screw hole are placed substantially near lateral ends of the top surface.

16. The precision soldering fixture as claimed in claim 12 further comprises:
- a base;
wherein:
- the base farther comprising
- a base fastener;
- the base is fastened to the support member with the base fastener; and
- the support member further comprises a base hole.

17. A precision soldering fixture comprises:
- a support member;
- a clamping assembly; and
- a base;
wherein:
- the support member further comprises at least one elongated channel,
  - a perpendicular groove,
  - a first screw hole,
  - a base surface,
  - a top surface, and
  - a second screw hole;
- the clamping assembly further comprises a first captive screw,
  - a first knurled finger nut,
  - a first clamping bar,
  - a second captive screw,
  - a second knurled finger nut, and
  - a second clamping bar;
- the top surface further comprises a front area, and a rear area;
wherein:
- the at least one elongated channel runs generally parallel with a longitudinal axis of the support member;
- the first knurled finger nut defines a first cavity;
- the second knurled finger nut defines a second cavity;
- a first captive screw hole partially receives the first captive screw wherein a first portion of the first captive screw extends outwardly from the support member;
- the first clamping bar is pivotally attached to the first captive screw;
- the first cavity rotatably receives the first portion of the first captive screw;
- one of the at least one elongated channel partially receives one of the at least one wire;
- a wire portion of one of the at least one wire extending above the top surface of the support member;
- the first clamping bar is clamped down on one of the at least one wire via the first knurled finger nut;
- a second captive screw hole partially receives the second captive screw wherein a second portion of the second captive screw extends outwardly from the support member;
- the second clamping bar is pivotally attached to the second captive screw;
- the second cavity rotatably receives the second portion of the second captive screw;
- the second clamping bar is clamped down via the second knurled finger nut;
- the support member further comprises a base hole;
- the base further comprising
- a base fastener; and
- the base is fastened to the support member with the base fastener.

18. The precision soldering fixture as claimed in claim 17 wherein:
- one of the at least one elongated channel and the perpendicular groove are positioned on the front area of the top surface;
- one of the at least one elongated channel and the perpendicular groove are positioned on the rear area of the top surface;
- the first screw hole and the second screw hole may be positioned in the middle relative to a transverse axis of the support member and between the at least one elongated channel; and
- the first screw hole and the second screw hole are placed substantially near lateral ends of the top surface.

19. The precision soldering fixture as claimed in claim 18 wherein one of the at least one elongated channel terminates in a connector notch.

20. The precision soldering fixture as claimed in claim 18 wherein the base is a plate structure.

* * * * *